United States Patent

[11] 3,596,264

| [72] | Inventor | Michael F. Ciemochowski |
| | | Warren, Mich. |
| [21] | Appl. No. | 806,882 |
| [22] | Filed | Mar. 13, 1969 |
| [45] | Patented | July 27, 1971 |
| [73] | Assignee | Holley Carburetor Company |
| | | Warren, Mich. |

[54] MULTICHANNEL FROST ICE AND SNOW DETECTING DEVICE
12 Claims, 8 Drawing Figs.

[52] U.S. Cl. .................................................. 340/234
[51] Int. Cl. ............................................... G08b 21/00
[50] Field of Search ................................... 340/234; 324/81; 73/17

[56] References Cited
UNITED STATES PATENTS

| 3,164,820 | 1/1965 | Hulett | 340/234 |
| 3,428,890 | 2/1969 | Peck et al. | 340/234 |
| 3,287,974 | 11/1966 | Ciemochowski | 340/234 |
| 3,284,003 | 11/1966 | Ciemochowski | 73/17 |

Primary Examiner—Robert L. Griffin
Assistant Examiner—Barry Leibowitz
Attorney—Walter Potoroka, Sr.

ABSTRACT: A device for both anticipating and detecting the formation and presence of frost, ice or snow on a particular surface employs signal-producing sensing means to sense the temperature of the surface, the temperature of the atmosphere, the atmospheric humidity, as well as the presence of either free water, frost, ice or snow. The signals produced in response thereto are compared to certain established reference values indicative of freezing temperature, a predetermined difference between atmospheric temperature and surface temperature, a preselected relative humidity as well as relative electrical conductivity of free water, frost, ice or snow in order to logically determine if the formation of frost or ice is anticipated and in accordance with such determination create an appropriate first output response and to in accordance with the same signals logically determine whether it is merely free water which is being sensed or if it is actually frost, ice or snow and in accordance with such a determination create an appropriate second output response.

PATENTED JUL27 1971

INVENTOR.
MICHAEL F. CIEMOCHOWSKI

BY Walter Potnoka, Jr.
ATTORNEY

INVENTOR.
MICHAEL F. CIEMOCHOWSKI
BY Walter Potrosko, Jr.
ATTORNEY 3,596,264

MULTICHANNEL FROST ICE AND SNOW DETECTING DEVICE

BACKGROUND OF THE INVENTION

This invention relates generally to atmospheric and surface condition indicating devices and more particularly to an electrical device for both anticipating the formation and detecting the presence of frost, ice or snow on a selected surface.

In many instances it is desirable to detect situations frost, ice or snow formation on selected surfaces where such formations may result in dangerous conditions. Some examples of such are the formation of frost or ice on airport runways and on bridge roadway surfaces.

Various devices have been proposed by the prior art; however, such devices have proven to be unsatisfactory for one or more of the following reasons. Many of the prior art structures are of the anticipatory type. That is, they are not able to detect the substantially precise movement of, for example, frost formation on the monitored surface and must instead rely on such parameters of humidity, atmospheric temperature and dew point in order to compute if such parameters indicate frost to be imminent. However, because of variations in combinations of such parameters which will result in frost formation plus the variations in performance characteristics of the device itself, such devices are purposely calibrated so that they actually indicate the existence of, for example, frost or ice formation when no such frost or ice in fact exists. That is, the device is actually anticipating such formations.

It can be appreciated that if such prior art devices were employed on a series of bridges and the motorists, as they approached the respective bridges, saw some advanced warning (actuated by the sensing device) that each of the bridges was icy and upon driving onto the bridge finding it in fact not icy, the motorists would quickly lose all future reliance on such advance warning systems.

Other prior art devices, relying strictly on the sensing of atmospheric conditions, overlook situations where, for example, it may be raining at one area along a roadway and yet the rain might be freezing at some area along the roadway as, for example, a viaduct, bridge or some other area where because of elevations, wind patterns and other factors wide variations in or rapid changes of temperature may occur. As an example, bridges will experience frost or ice formations quicker than the roadway leading to and from the bridge because the bridge is more nearly completely exposed to the atmosphere than is the earth-sheltered roadway, thereby resulting in quicker cooling of the road surface on the bridge. Therefore, the bridge surface is likely to attain dew point and freezing conditions while the highway leading to the bridge is experiencing only rain or free water. Accordingly, such prior art systems which rely merely on sensing atmospheric conditions do not have the ability to distinguish as between the atmosphere and what is actually happening on a selected surface such as the bridge road surface, in order to give advance warning.

Still other systems would remain energized continuing to give warning of icy conditions even though the surface was salted and the frost, ice or snow previously formed thereon, melted to free water. This, of course, would have the same effect on motorists as would a prolonged anticipatory signal as previously discussed.

Further, none of the prior art devices both anticipated the formation and then actually detected the existence of frost, ice or snow and in response thereto create a first output signal such as an early warning to those personnel (such as a county road maintenance station) charged with the responsibility of treating the road surfaces as with salt, that the formation of frost, snow or ice is imminent and to create a second output signal for the motorists' benefit to advise them that the monitored surface does actually have icy formations thereon when such conditions have actually occurred.

The invention as herein disclosed and claimed concerns itself with the solution of these as well as other problems.

SUMMARY OF THE INVENTION

According to the invention a device for both anticipating the formation and detecting the presence of an atmospheric formation on a surface comprises first means for creating a first output signal indicating that said surface has attained a first predetermined temperature, second means for creating a second output signal indicating that a predetermined difference in temperature is attained between said first predetermined temperature and the temperature of the ambient atmosphere, third means for creating a third output signal indicating that the ambient atmosphere has attained a predetermined value of relative humidity, fourth means effective for creating a fourth output signal indicative of the presence of said formation on said surface, fifth means effective for determining if said formation is merely free water or if said formation consists of frost, snow or ice and creating in accordance therewith a fifth output signal, sixth means adapted to receive said first, second and third signals, and seventh means adapted to receive said first, fourth and fifth signals, said sixth means being effective upon simultaneously receiving said first, second and third signals for causing actuation of related first output means, said seventh means being effective upon simultaneously receiving said first, fourth and fifth signals for causing actuation of related second output means.

Accordingly, a general object of this invention is to provide a device for both anticipating and detecting the presence of a formation of frost, snow or ice and create appropriate action, in response thereto, in related warning or control devices.

Another object of this invention is to provide a device which will both anticipate and detect the presence of a formation of frost, snow or ice and create a first output signal which will indicate the anticipation of such a formation occurring and create a second signal which will indicate the actual occurrence of such a formation with each of such signals terminating when such atmospheric and/or surface conditions cease to exist.

Other more specific objects and advantages of the invention will become apparent when reference is made to the following detailed description considered in conjunction with the accompanying drawings wherein certain details may be omitted from one or more views for purposes of clarity.

DESCRIPTION OF THE PREFERRED EMBODIMENT

Figure 1:
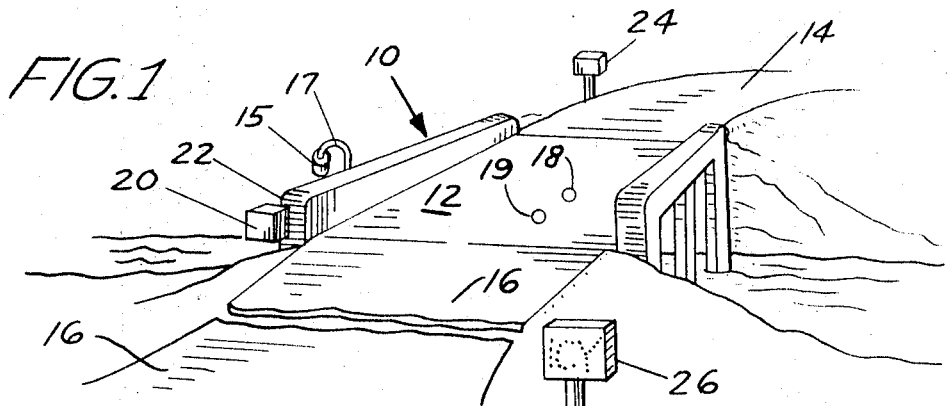
FIG. 1 is a perspective view of a bridge having a road surface formed thereon and provided with a detecting device constructed in accordance with the teachings of this invention.

Referring now in greater detail to the drawings, FIG. 1 illustrates a highway bridge 10 having a road surface 12 formed thereon which, at respective ends, joins the roadway portions 14 and 16. A first sensor assembly 15, supported as by a bracket 17 from the bridge rail and a second plurality of sensor assemblies 18 and 19, which are suitably imbedded within the bridge road surface 12, are connected through suitable electrical circuitry to a control panel, which may be housed as within a box 20 mounted on a structural portion 22 of the bridge 10, and suitable sensory warning devices among which may be electrically energized signs 24 and 26 located along the highway portions 14 and 16 approaching the bridge from opposite directions.

As will become evident, the preferred form of the invention employs sensor assemblies 18 and 19 which are structurally equivalent to each other. However, for both clarity and ease of description, the sensor assemblies are identified by different reference numbers. Nevertheless, for purposes of disclosure, it may be assumed that each of the sensor assemblies is comprised as typically illustrated by the axial cross-sectional view of FIG. 2 and the corresponding transverse cross-sectional view of FIG. 3.

Figure 2:
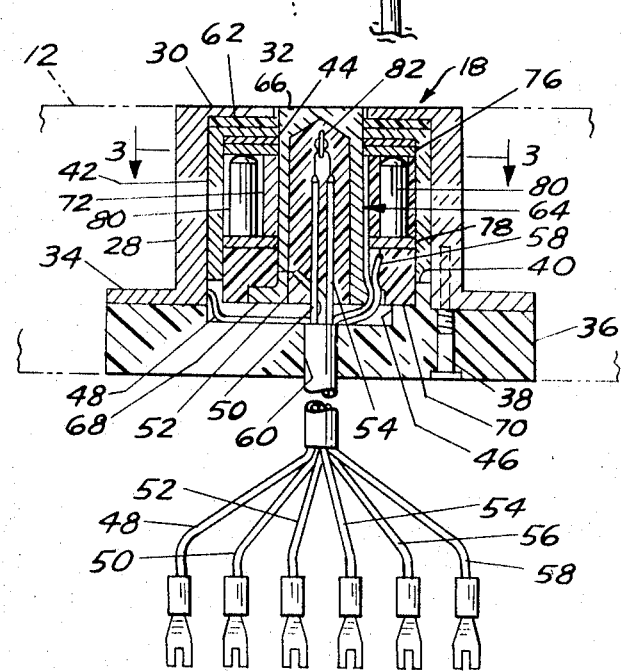
FIG. 2 is an axial cross-sectional view of a typical parameter sensing assembly employed in the invention.

Referring to FIG. 2, sensor assembly 18 is illustrated as being comprised of an outer cuplike housing 28 provided with an end portion 30 having an aperture 32 formed therethrough and a radiating flange 34 formed at the other end by which the housing 28 may be secured in abutting relationship to the electrically nonconductive base 36 as by suitable screws, one of which is shown at 38.

Base 36 has formed thereon a circular ridge portion 40 which supports an inner cuplike housing 42 having an aperture 44 formed in the upper end thereof. A shot 46, formed in the upper surface of base 36 generally within the confines of ridge 40 is provided for the passage therethrough of conductors 48, 50, 52, 54, 56 and 58 which may be grouped into a cablelike bundle in order to pass through base aperture 60.

An electrically nonconductive washerlike member 62 contained generally between the ends of outer and inner housings 28 and 42 is provided with a centrally formed aperture which closely receives therethrough the thermistor housing or inner electrode 64. Spacer or washer 62 also serves as a radial thrust support functioning to assure the maintaining of thermistor housing 64 centrally disposed within aperture 32 so that no contact is experienced between the outer surface of thermistor housing 64 and the surface of either aperture 32 or aperture 44.

Thermistor housing 64, which as will become evident also acts as an inner electrode, is of generally cylindrical tubular construction having a closed end defining an upper surface 66 and a radiating flange 68 formed at the other end so as to operatively abut against the upper surface 70 within the ridge 40 of base 36. Suitable slotted portions, as illustrated, may be formed in the flange 68 in order to permit the passage therethrough of conductors 48, 56 and 58.

A tubular spacer 72, having an axial slit 74 formed therethrough as to accommodate the passage of conductor 56, situated about the thermistor housing 64 serves as an axial spacer for oppositely disposed cooperating printed circuit boards 76 and 78. Each of the boards 76 and 78 is provided with apertures formed therein to receive individual electrical leads from a plurality of resistors 80 situated between the printed circuit boards and circumferentially about the thermistor housing 64. The printed circuits on each of the boards 76 and 78 are such as to place the plurality of resistors 80 in parallel with respect to each other and, as a group, in series with conductors 56 and 58 which are also suitably respectively connected to the printed circuits of boards 76 and 78.

A thermistor 82, shown as being a disc of semiconductor material having catwhisker leads respectively electrically connected to conductors 50 and 54, is situated within said thermistor housing 64 generally centrally thereof. The thermistor 82, as well known in the art, changes its electrical resistivity in accordance with the temperature sensed thereby.

The various cavities surrounding the resistors 80, the space at opposite sides of printed circuit boards 76 and 78 and the space within thermistor housing 64 are preferably filled with nylon which may be introduced therein in liquid form when the inner housing 42, thermistor housing 64, printed circuit boards 76, 78, resistors 80 and associated electrical conductors are first combined into a subassembly.

As can be seen from FIG. 2, one end conductor 48 is electrically connected to outer housing or electrode 28, one end of conductor 52 is electrically connected to thermistor housing or inner electrode 64 and one end of conductor 56 and conductor 58 are respectively connected to printed circuit boards 76, 78 while, as previously stated, conductors 50 and 54 have their respective one ends electrically connected to thermistor 82. The respective other ends of conductors 48, 50, 52, 54, 56 and 58 are suitably electrically connected, in accordance with the teachings of this invention, to the control panel within panel housing 20.

Figure 4:
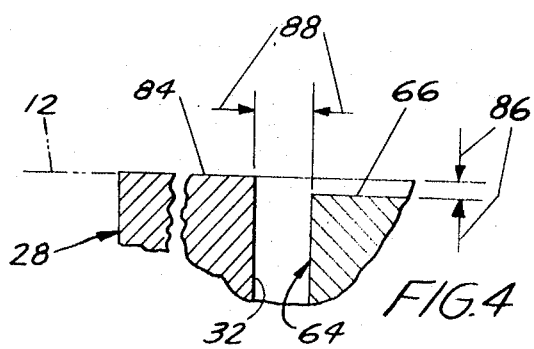
FIG. 4 is an enlarged cross-sectional view of a fragmentary portion of the assembly of FIG. 2.

FIG. 4, an enlarged cross-sectional view of a fragmentary portion of the sensor assembly 18 of FIG. 2, illustrates in greater detail the preferred configuration of certain of the elements typically comprising the sensor assembly. In the preferred form, upper surface 66 of inner electrode or thermistor housing 64 is made so as to be 0.002 inches to 0.005 inches below the plane of upper end surface 84 of the outer housing or electrode 28. This is pictorially represented as the distance between opposed arrows 86. Further, in the preferred form, the radial gap between the outer cylindrical surface of inner electrode 64 and the surface of orifice 32 is made to be in the order of 0.005 inches to 0.030 inches. This is pictorially represented as the distance between opposed arrows 88.

Before progressing to the other Figures, it should be mentioned that the preferred form of the invention employs two sensor assemblies as typically illustrated in FIG. 2. However, as will become evident, in the normal course of operation one of the sensors does not have its resistors 80 energized at any time; such sensor will be referred to as an "unheated" sensor and identified as sensor 19 while the sensor 18 will have its resistors 80 energized in order to create a heating effect; accordingly, sensor 18 will be referred to as either a "heated" or "heatable" sensor.

Figure 5:
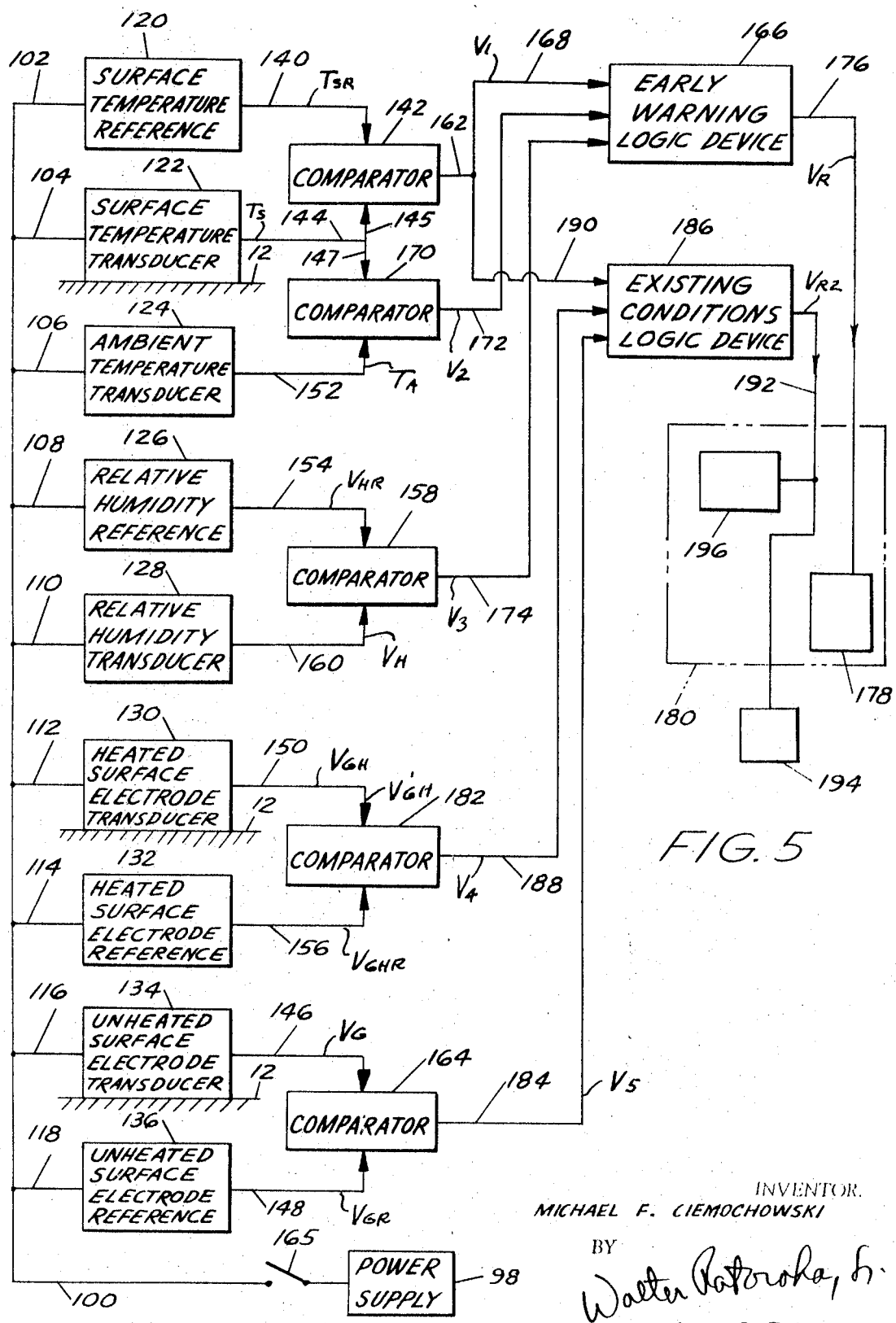
FIG. 5 is a schematic representation of apparatus embodying the invention.

In FIG. 5, a schematic representation of apparatus embodying the invention, a suitable source of electrical energy 98, preferably regulated, supplies electrical power as by a main conductor 100 to branch conductor means 102, 104, 106, 108, 110, 112, 114, 116 and 118 respectively leading to a surface temperature reference device 120, a surface temperature transducer 122, an ambient temperature transducer 124, a humidity reference device 126, a humidity transducer 128, a heated surface electrode device 130, a heated surface electrode reference device 132, an unheated surface electrode transducer device 134 and an unheated surface electrode reference device 136.

Further defining the apparatus of FIG. 5, the thermistor 82 of unheated sensor 19 comprises surface temperature transducer 122, while the gap 88 between inner electrode 64 and the outer electrode 28 of unheated sensor 19 comprises the surface electrode transducer 134. The surface temperature reference device 120, the heated surface electrode reference device 132, the unheated surface electrode reference device 136 and the humidity reference device 126 are each comprised of a variably set potentiometer. The gap 88 between inner electrode 64 and outer electrode 28 of heated sensor 18 comprises the heated surface electrode transducer 130.

Figure 6:
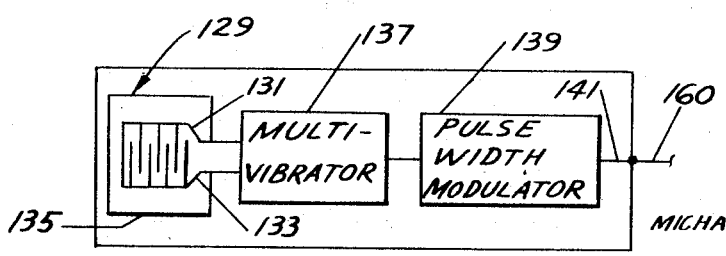
FIG. 6 is a schematic illustration of a device shown by FIG. 5.

A particular electrical system which is satisfactory for the relative humidity transducer 128 is illustrated in FIG. 6, it being understood that this system is representative and not by any means the only possible arrangement for transducer 128.

The relative humidity transducer 128, as illustrated in FIG. 6, comprises a relative humidity sensing element 129, which may consist of a pair of conductors 131 and 133 in intermingled comb-shapes on a printed circuit board 135 with the gaps between fingers of the two conductors being held constant. The assembled board is coated with a mixture consisting of a suitable polyvinyl alcohol mixture. In this instance, the humidity sensing element 129 has an electrical impedance which varies when the element is responding to relative humidities. The impedance is converted to an electrical signal, representative of relative humidity by any suitable means, such as the timing element of a one-slot or monostable multivibrator 137. The multivibrator 137 then creates and directs a train of pulses to a pulse width modulator 139 which amplifies and inverts the DC component of the pulse train and in accordance therewith produces an output signal as on conductor 141.

Further discussion of the apparatus of FIG. 5 will best be understood if, as follows, combined with certain exemplary assumed conditions and related mode of operation.

It should, of course, be remembered that the invention is intended to both anticipate and detect the formation of either frost, ice or snow on the surface 12 and institute appropriate action in accordance therewith. Therefore the entire apparatus may be considered as one which measures certain variable parameters and compares such measurements against established known quantities or reference values in order to logically determined whether such variable parameters individually meet the conditions for either anticipating or detecting the actual formation or presence of frost, ice or snow. Generally speaking, whenever the temperature of surface 12 is equal to dew point frost will start to form on the surface 12.

Accordingly, let it be assumed that:

1. the surface temperature reference potentiometer 120 has been adjusted and set as to create a voltage output signal, $T_{SR}$, on conductor 140, of a value indicative of the temperature at which it is desired that the comparator 142 produce a signal as, for example, 32° F.;

2. the surface temperature transducer or thermistor 122 continually senses the temperature of surface 12 and creates in accordance therewith a variable voltage output signal, $T_S$, on conductor 144 and to branch conductors 145 and 147 respectively leading to comparator 142 and comparator 170;

3. the resistance value of the gap 88 or heated surface electrode transducer 130 is normally infinitely high but when:

a. frost forms to bridge the gap 88 so as to complete a circuit between electrodes 28 and 64 (sensor assembly 18), a voltage output signal, $V_{GH}$, is created on conductor 150 (for purposes of illustration the value of signal $V_{GH}$ will be assumed to be 9.5 volts when frost is bridging the gap 88);

b. water is present and bridges the same gap 88 a voltage output signal, $V'_{GH}$, is created on conductor 150 (for purposes of illustration the valve of signal $V'_{GH}$ will be assumed to be 2.0 volts);

4. the resistance value of the gap 88 or surface electrode transducer 134 is normally infinitely large but that when ice or frost bridges the gap 88 so as to complete a circuit between electrodes 28 and 64, a voltage output signal, $V_G$, of predetermined magnitude, indicative of the existence of ice across the gap 88 or some resistance higher than that presented by the existence of water thereacross, is created on conductor 146;

5. the surface electrode reference potentiometer 136 has been adjusted and set as to create a voltage output signal, $V_{GR}$, on conductor 148 which is equal in magnitude to the value of voltage output signal, $V_G$, when such signal, $V_G$, exists;

6. the heated surface electrode reference potentiometer 132 has been adjusted and set as to create an output voltage signal, $V_{GHR}$, on conductor 156, the value of which is assumed to be 2.0 volts;

7. the ambient temperature transducer 124, which may be a thermistor or a suitable variable resistor housed within assembly 15 (see FIG. 1) continually creates a variable voltage output signal $T_A$, on conductor 152 leading to comparator 170;

8. the relative humidity reference device 126, which may be a variably set potentiometer, has been adjusted and set as to create an output voltage signal, $V_{HR}$, on conductor 154 leading to a comparator 158 (the value of the voltage selected as the reference signal is further assumed to be equal to that voltage developed by the relative humidity transducer 128 when a relative humidity of 90 percent is sensed); and 9. the relative humidity transducer 128 creates a variable output voltage signal, $V_H$, dependent upon sensed relative humidity, on conductor 160 also leading to the comparator 158.

OPERATION

Let it now be assumed that the invention as shown by FIG. 5 is made operational, as by the closure of switch 165, and the temperature of surface 12 is at some value above freezing but that it is steadily decreasing and that the relative humidity is 80 percent but steadily increasing.

At this time the surface temperature reference potentiometer 120 is producing the voltage signal $T_{SR}$ indicative of 32° F. and applying this signal to comparator 142. As the temperature of surface 12 decreases, the value of output voltage signal $T_S$ produced by the surface temperature transducer 122 continually changes in accordance with the temperature until such time as the temperature of surface 12 reaches 32° F. At this time the value of output voltage signal $T_S$ equals reference voltage signal $T_{SR}$ which equality is sensed by comparator 142. Comparator 142, in turn, causes a voltage signal $V_1$ to be impressed onto the logic device 166 via conductor 162 and branch conductor 168. The production of the signal $V_1$ indicates that one of the conditions established for the anticipation of the formation of frost has occurred and said signal $V_1$ will continue to exist even though the temperature sensed by transducer 122 decreases to below that reference value established by reference potentiometer 120.

During this time the surface temperature transducer 122 (thermistor 82 in the unheated sensor assembly 19) also transmits the voltage signal, $T_S$, representative of the varying surface temperature, along branch conductor 147 to comparator 170 while the ambient temperature transducer 124 is continually producing the voltage signal, $T_A$, (indicative of the actual ambient temperature) and directing it to comparator 170 via conductor 152. Comparator 170 is so set as to create an output voltage signal, $V_2$, on conductor 172 whenever the voltage signal $T_S$ from surface temperature transducer 122 is of a value indicating a surface temperature at least 4° F. less than the ambient temperature indicated by signal $V_2$ created by the ambient temperature transducer 124. The voltage signal $V_2$ is transmitted via conductor 172 to the early warning logic device 166.

As previously established, for purposes of example, the relative humidity reference device 126 continually creates and directs a voltage signal $V_{HR}$ (of a magnitude indicative of a 90 percent relative humidity) to comparator 158. Simultaneously, the relative humidity transducer 128 applies its signal $V_H$ indicative of actual relative humidity to comparator 158. As the relative humidity increases the value of signal $V_H$ also increases; however, no output voltage signal will be produced by the comparator 158 until the transducer 128 senses (in this example) an actual relative humidity of 90 percent. When signal $V_H$ indicates a relative humidity of 90, or greater, the comparator 158 will produce a third output voltage signal $V_3$ on conductor 174 and apply it to the early warning logic device 166.

It can be seen that the structure thus far described has applied three signals, $V_1$, $V_2$, and $V_3$ to logic device 166 whenever the following parameters are achieved:

1. the temperature of monitored surface 12 has reached at least 32° F.;

2. the temperature of monitored surface 12 is at least 4° F. less than the ambient temperature; and 3. the relative humidity of the ambient atmosphere has reached at least 90 percent.

(The above are, of course, exemplary and actual installations of the invention could be set to respond to the attainment of different actual values of these same parameters.)

The early warning logic device 166 is such as to, in turn, create a first resultant signal $V_R$ on conductor 176 whenever the logic device 166 senses the simultaneous presence of all three output signals $V_1$, $V_2$, and $V_3$. The resultant signal $V_R$ will continue to exist for as long as all three of such output signals $V_1$, $V_2$ and $V_3$ are simultaneously sensed. As is shown in FIG. 5, conductor 176 leads to a suitable device 178 to be thereby energized or actuated; device 178 may be some sensory warning device located at a station 180, situated remotely to the monitored surface 12, as, for example, a highway maintenance station regionally situated and responsible for the maintenance and service of a number of monitored road or bridge surfaces within a defined geographical area. The actuation of device 178 would then give warning, to those concerned personnel of the fact that frost or icing formation on the monitored surface is anticipated thereby enabling such personnel to exercise, in advance, appropriate safety measures.

Since at this time neither frost nor ice has actually formed, the electrical resistance of the heated surface electrode transducer 130 (gap 88 of sensor assembly 18) as well as the electrical resistance of the unheated surface electrode transducer 134 (gap 88 of sensor assembly 19) will be infinitely high and therefore comparators 182 and 614 will not produce any actuating output signals.

However, if no action is taken by the said concerned personnel as a result of the early warning exhibited by the energized device 178, and atmospheric conditions continue in the direction favorable to the formation of frost or ice, the comparators 182 will respectively create output voltage signals $V_4$ and $V_5$ in the following manner.

First, it should be remembered that the sensor assembly 18 is heated to a temperature above freezing and maintained at, for example, 38° F. This, of course, is done by the plurality of heaters 80 and the temperature maintained as by the thermistor 82 within sensor assembly 18 in a manner well known in the art. That is, the heaters 80 would be energized upon closure of switch 165 and the regulation of electrode temperature would be done by the thermistor 82 acting as a thermostat to create a feedback in order to intermittently turn off the current flow to the heaters thereby maintaining the electrodes at a temperature within a prescribed range of the desired nominal temperature of 38° F.

As frost or ice starts to form bridging the gap 88, the electrical resistance value changes and the unheated surface electrode transducer 134 will produce the output voltage signal $V_G$ and apply it to comparator 164 via conductor 146. Since, as previously stated, the voltage values of signals $V_G$ and $V_{GR}$ are equal, comparator 164 will create and apply an output signal voltage $V_S$ on a conductor 184 leading to an existing conditions logic device 186.

However, any frost which starts to form on the electrodes of sensor assembly 18, as well as any snow which might fall on the same electrodes, is quickly melted by virtue of the heat supplied thereto by energized heaters 80 thereby causing such frost or snow to form free water which bridges the gap 88 between the electrodes. Consequently, the resistance of the gap 88 (transducer 130) of sensor assembly 18 is decreased so as to now exhibit a voltage thereacross of 2.0 volts (a value assumed for purposes of illustration).

It was previously stated that the heated surface electrode reference 132 was set as to produce an output signal $V_{GHR}$ indicative of a value of 2.0 volts. Accordingly, it can be seen that at this time both signals $V_{GH}$ and $V_{GHR}$ are equal and comparator 182, in response thereto, creates and applies an output voltage signal $V_4$ on conductor 188 leading to the second logic device 186. Also, it can be seen that a branch circuit conductor 190 transmits signal $V_1$, created by comparator 142, to logic device 186.

Once logic device 186 senses the presence of all of signals $V_1$, $V_4$ and $V_5$ conductor means 192 is energized as by a second resultant signal $V_{R2}$ causing, in turn, energization of sensory warning means 194 (which may comprise the electrically energizable signs 24 and 26 of FIG. 1) as well as additional remotely spaced means 196 which may be situated within the remote station 180. Of course, means 196 may well include suitable circuitry, depending on the type of surface being monitored, which will initiate, in and of itself, appropriate corrective action.

Such corrective action could include the energization of heaters which would be employed for heating the surface being monitored in order to eliminate therefrom such frost or icing conditions.

In view of the above, it can be seen that the second existing conditions logic device 186 is energized upon the attainment of the following sensed parameters:

1. the temperature of the monitored surface is at 32° F.;
2. the unheated electrode transducer 134 senses the presence of some atmospheric formation other than water and produces a signal in response thereto;
3. the heated electrode transducer 130 is exposed to the same atmospheric formation and because such formation melts it is determined that such formation was either rain to start with, frost or snow; and
4. as a matter of logic, the transducer 134 has already determined that the formation was something other than water, then the only possibility remaining is that the signal generated by transducer 130 was due to either frost or snow the knowledge of the presence of either one of which is desired.

The energizing output signal $V_{R2}$ will of course continue only for as long as the simultaneous presence of signals $V_1$, $V_4$ and $V_5$ is sensed by logic device 186.

It should also be apparent that the invention herein described provides means whereby the warning devices such as 24 and 26 would become deenergized when the road surface 12 was salted because such salting would result in the formation of water within the gap 88 of sensor assembly 19 thereby causing the loss of signal $V_G$ and the consequent loss of resultant signal $V_S$. This is contrary to many proposed prior art structures which continue to indicate the presence of hazardous road surface conditions even after such roadways have been salted.

Further, the invention provides means whereby the formation of frost, ice or snow is anticipated and selected personnel, other than motorists, informed of the imminence of such formations. In prior art devices, the motorist was often warned of icy conditions when in fact such conditions did not exist but were merely anticipated. After a few such experiences, the motorist tends to lose his reliance on the warning device and such loss of reliance may result in tragic consequences when such icy conditions do in fact exist.

Figure 3:
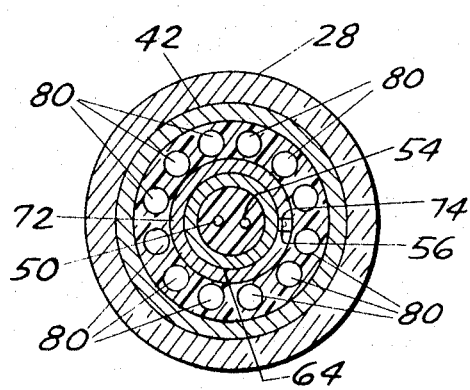
FIG. 3 is a cross-sectional view taken generally on the plane of line 3-3 of FIG. 2 and looking in the direction of the arrows.

The invention has been disclosed as employing two sensor assemblies 18 and 19, each of which is constructed in accordance with the disclosure of FIGS. 2 and 3. It should be apparent that the system as disclosed by FIG. 5 could be practiced by employing other sensor assemblies, or portions thereof, in combination with electrical components well known in the art in the manner and mode of operation disclosed herein.

For example, any suitable transducers could be employed for elements 122, 130 and 134 of FIG. 5 without the necessity of having the precise structure or assembly of the sensor assemblies 18 and 19. Further, the comparators 142, 170, 158, 182 and 164, sometimes referred to as differential electrical amplifiers (operating in a comparative mode and set for a particular switching level), are well known in the art and therefore a detailed description of their construction and mode of operation is not deemed to be necessary.

Even if sensor assemblies as disclosed by FIGS. 2 and 3 are employed in practicing the invention, it is not essential that both be identical. That is , for example, sensor assembly 19 may have omitted therefrom the heater section comprised of the plurality of resistor heaters 80 since such resistors are not employed during the operation of the invention; however, it is of benefit to have both sensor assemblies provided with a heater section and related wiring circuitry so that in the event of a failure in the "heated" sensor assembly 18, the functions of the two sensor assemblies can be reversed resulting in the previously unheated sensor assembly becoming the heated sensor assembly.

The invention as herein disclosed may be employed in "multiple" arrangements especially as applied to such monitored surfaces as may exist at airports.

The airports serving many metropolitan areas usually include relatively long runways which may extend for a length of 1 to 2 miles. In such situations the atmospheric conditions may be substantially identical throughout the entire airport facility including all of the runways. However, because of variations in the surrounding topography, variations in wind patterns, variations in the surface area of the runways, variations in the thickness of the runways as well as possible variations in the composition of the material forming and boarding the runways certain runways may experience frost or icing formations ahead of other runways. Moreover, a particular runway, because of its long length, might exhibit frost formation in certain sections prior to the occurrence of such frost or icing on the remaining portion of the runway.

Airports, as most other facilities, are not equipped to be able to provide instantaneous and total service to all concerned areas. Therefore, it becomes important to know not only if frost or icing formations are anticipated generally, but also to determine the precise locations of such actual formations so that, if need be, such locations can be serviced on a priority basis without the need of having to take the time to service the entire length of a long runway.

Further, because pilots are usually landing or taking off in their aircraft in at least a slight crosswind it becomes advantageous to such pilots to know what the surface condition of the runway is like. That is, if the pilots have some advance warning they can better anticipate the corrective action that they may have to undertake when the aircraft wheels touch the slippery surface if such is the condition of the runway or a portion thereof.

Figure 7:
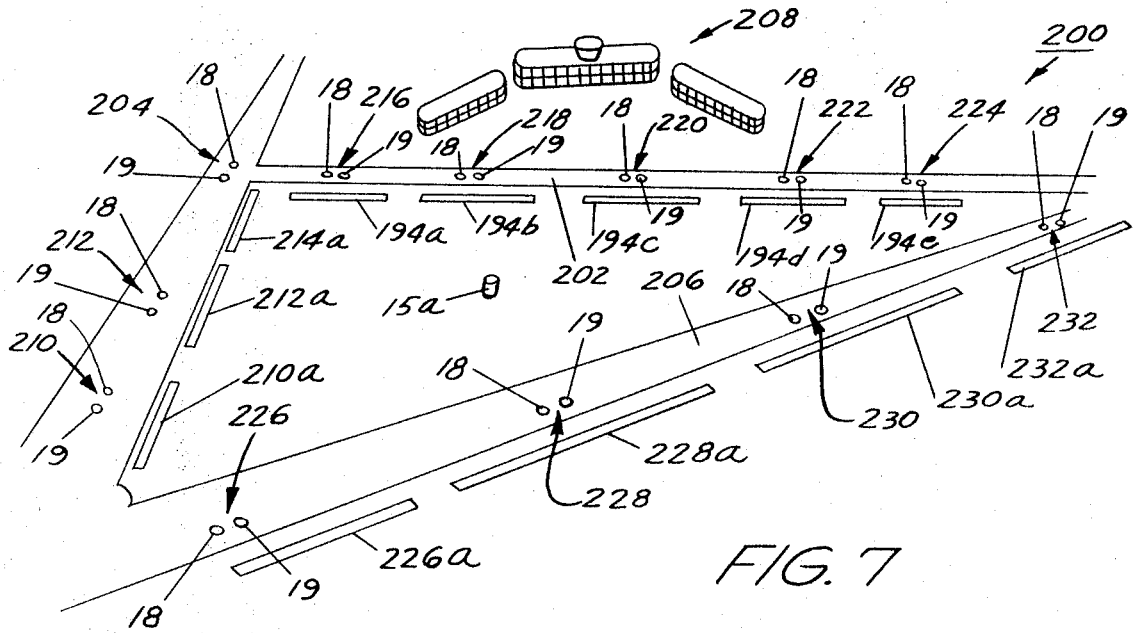
FIG. 7 illustrates an airport with runways equipped with the invention.
Figure 8:
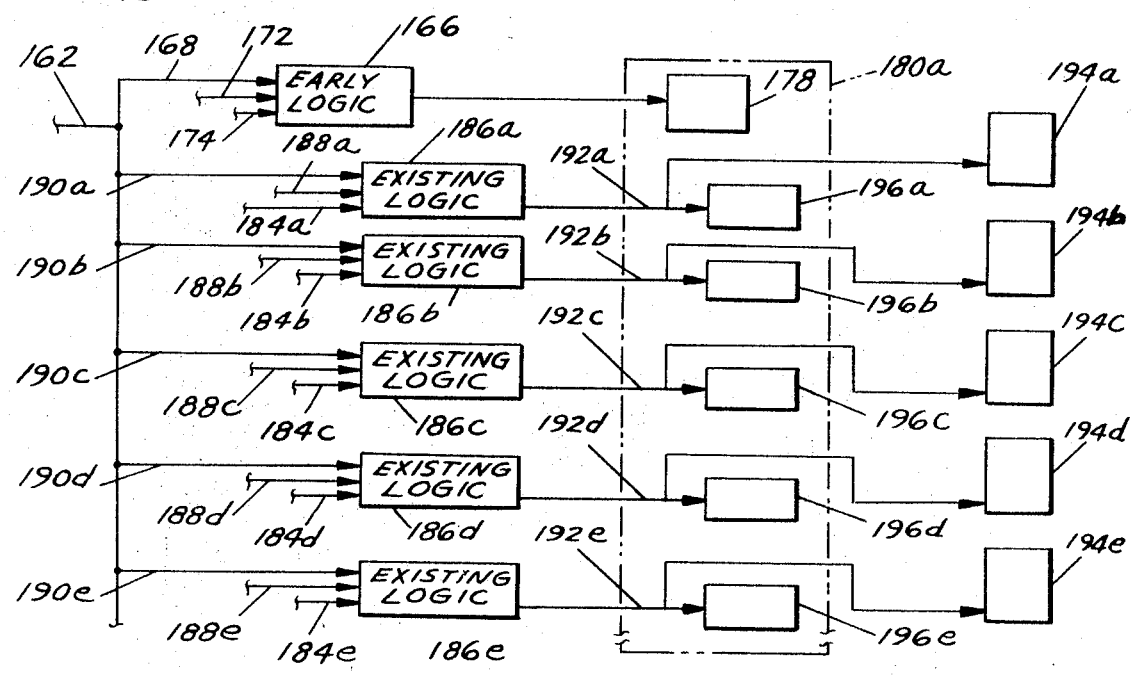
FIG. 8 is a fragmentary schematic diagram illustrating a possible modified arrangement of the invention applied to the airport of FIG. 7.

The invention, as disclosed in FIGS. 1—6 and applied as disclosed in FIGS. 7 and 8, is suited for performing in a manner as to achieve the above objectives.

Referring now in greater detail to FIGS. 7 and 8, an airport facility is generally illustrated at 200 as being comprised of a plurality of runway surfaces 202, 204 and 206 situated in proximity to related terminal and service buildings 208.

Runway 24 is provided with a plurality of pairs 210, 212 and 214 of cooperating sensor assemblies 18 and 19; runway 202 is similarly provided with a plurality of pairs 216, 218, 220, 222 and 224 of cooperating sensor assemblies 18 and 19; while runway 206 is provided with a plurality of pairs 226, 228, 230, and 232 of cooperating sensor assemblies 18 and 19. The ambient temperature transducer 124 and the relative humidity transducer 128 (FIG. 5) may, of course, be generally centrally situated within a suitable housing 15a (functionally equivalent to housing 15 of FIG. 1).

For purposes of illustration and discussion, only runway 202 and the related pairs sensor assemblies will be considered in the description relating to FIG. 8. That is, for example, the remotely situated station 180a (functionally equivalent to station 180 of FIG. 5), which may be within one of the airport service buildings 208, is illustrated as comprising warning devices 196a, 196b, 196c, 196d and 196e (each of which is functionally equivalent to device 196 of FIG. 5). However, in practice such a station 180a may in fact contain such warning devices in numbers equivalent to the number of pairs of cooperating sensor assemblies as are contained within all of the runways 202, 204 and 206 (along with whatever other surfaces are desired to be monitored).

Further, all elements in FIG. 8 which are like or functionally equivalent to those of FIG. 5 are identified with either like reference numbers or, where a plurality of such elements are shown, with like reference numbers provided with a letter suffix.

The operation of the invention as shown in FIG. 8 is that as described with reference to FIG. 5. That is, early warning logic device 166 would be responsive to and in turn create the same signals as that of FIG. 5. The only difference in the overall system is that the existing conditions logic device 186a would be actuated in response to signals generated by pair 216 of sensor assemblies 18 and 19, existing conditions logic device 186b would be energized in response to signals generated by pair 218 of sensor assemblies 18 and 19, existing conditions logic device 186c would be energized in response to signals generated by pair 220 of sensor assemblies 18 and 19, existing conditions logic device 186d would be energized in response to signals generated by pair 222 of sensor assemblies 18 and 19, while existing conditions logic device 186e would be energized in response to signals generated by pair 224 of sensor assemblies 18 and 19. It should of course be apparent that in the above arrangement a plurality of comparators would also be employed in combination with the multiple pairs of sensor assemblies 18 and 19 in a manner as taught by FIG. 5 and related description.

Accordingly, it can be seen that when the sensed atmospheric conditions are such as to indicate that frost or ice formation is anticipated, the early logic device 166 will create a resultant output actuating signal $V_R$ on conductor 176 which will cause energization or actuation of the early warning device 178 situated within the station 180a. This would in effect inform those personnel concerned with the servicing of all of the runways to make preparations because frost or ice formations are anticipated for the general area.

Now, if it is assumed that because of one or more of the influencing factors previously set out frost or ice starts to form in the vicinity of pairs 216 of sensor assemblies 18 and 19 the existing conditions logic device 186a would receive the appropriate signals via conductors 190a, 188a and 184a and in response thereto create an actuating output signal $V_{Rz}$ on conductor 192a thereby energizing or actuating warning device 196a. This would inform the said concerned personnel that the section of runway 202 in the vicinity of sensor pair 216 should be treated first since an actual frost or ice formation is sensed at that area. This information would enable the service personnel to take appropriate action and devote only such time as is required to it necessary sequentially treat varying areas of the different runways thereby maintaining an optimum level of safety throughout the entire airport runway system.

Of course, as pairs 218, 220, 222 or 224 sense the presence of frost or ice formation, the respective existing conditions logic devices 186b, 186c, 186d and 186e would be activated causing the respective resultant output signals, $V_{Rz}$, to be applied to conductors 192b, 192c, 192d and 192e, respectively, so as to actuate the station-located warning devices 196b, 196c, 196d and 196e.

In order to provide some warning for pilots of aircraft either in the process of landing on or taking off from the runways, the remotely situated warning devices 194a, 194b, 194c, 194d and 194e may actually comprise a line of segmented or sectioned banks of electric lights situated along the related runway. For example, as illustrated in FIG. 7, each of the sections of lights would be situated in proximity to the area of the runway monitored by the related pair of sensor assemblies 18 and 19.

Accordingly, if a pilot was landing his aircraft and he saw some medially located section of warning lights on he would know that he should anticipate the necessity of corrective action after touchdown and when the aircraft's wheels come onto the slippery portion.

Similarly, warning lights 210a, 212a, 214a, 226a, 228a, 230a and 232a would be placed in respective proximity to the sensor assemblies 210, 212, 214, 226, 228, 230 and 232.

Although only one preferred embodiment of the invention, and one modification thereof, have been disclosed and described, it is apparent that other embodiments and modifications of the invention are possible within the scope of the appended claims.

I claim:

1. A device for both anticipating the occurrence and detecting the presence of an atmospheric formation on a surface, comprising first means for creating a first output signal indicating that said surface has attained a first predetermined temperature, second means for creating a second output signal indicating that a predetermined difference in temperature is attained between said first predetermined temperature and the temperature of the ambient atmosphere, third means for creating a third output signal indicating that the ambient atmosphere has attained a predetermined value of relative humidity, fourth means effective for creating a fourth output signal indicative of the presence of said formation on said surface, fifth means effective for determining if said formation is merely free water or if said formation consists of frost, snow or ice and creating in accordance therewith a fifth output signal, sixth means adapted to receive said first, second and third signals, and seventh means adapted to receive said first, fourth and fifth signals, said sixth means being effective upon simultaneously receiving said first, second and third signals for causing actuation of related first output means, said seventh means being effective upon simultaneously receiving said first, fourth, and fifth signals for causing actuation of related second output means.

2. A device according to claim 1 wherein said first means comprises first temperature sensing means adapted to sense the temperature of said surface and produce in accordance therewith a first parameter output signal, temperature reference means adapted to produce a first reference signal of a predetermined magnitude indicative of a predetermined temperature, and additional means for receiving said first parameter output signal and said first reference signal, said additional means being effective upon receiving said first parameter output signal and said first reference signal for determining if said temperature of said surface is equal to or less than said predetermined temperature.

3. A device according to claim 2 wherein said temperature reference means comprises an adjustable potentiometer, and wherein said additional means comprises an electronic comparator, said comparator being effective for producing said first output signal.

4. A device according to claim 1 wherein said second means comprises first temperature sensing means adapted to sense the temperature of said surface and produce in accordance therewith a first parameter output signal, transducer means responsive to ambient atmospheric temperature and effective to produce in accordance therewith a second parameter output signal, and additional means for receiving said first parameter output signal and said second parameter output signal, said additional means being effective upon receiving said first parameter output signal and said second parameter output signal for determining if a predetermined minimum difference in temperature is indicated by said first and second parameter output signals and if said predetermined minimum difference is attained to create in response thereto said second output signal.

5. A device according to claim 4 wherein said first temperature sensing means comprises second temperature responsive transducer means, and wherein said additional means comprises an electronic comparator, said comparator being effective for producing said second output signal.

6. A device according to claim 1 wherein said third means comprises transducer means responsive to ambient atmosphere for determining the relative humidity thereof and creating in response thereto a first parameter output signal, humidity reference means adapted to produce a first reference signal of a predetermined magnitude indicative of a predetermined value of relative humidity, and additional means for receiving said first parameter output signal and said first reference signal, said additional means being effective upon receiving said first parameter output signal and said first reference signal for determining if said first parameter output signal indicates a value of relative humidity at least equal to said minimum value of relative humidity established by said first reference signal and to create in response thereto said third output signal.

7. A device according to claim 6 wherein said humidity reference means comprises an adjustable potentiometer, and wherein said additional means comprises an electronic comparator, said comparator being effective for producing said third output signal.

8. A device according to claim 1 wherein said fourth means comprises transducer means responsive to the presence of said formation and thereupon effective for creating a first parameter output signal, reference means for creating a reference signal of a predetermined magnitude, and additional means for receiving said first parameter output signal and said reference signal, said additional means being effective upon receiving said first parameter output signal and said reference signal for determining if said first parameter output signal is equal to or greater than said predetermined magnitude of said reference signal.

9. A device according to claim 8 wherein said transducer comprises spaced electrodes normally having an infinitely large electrical resistance between said electrodes and a range of finite electrical resistances between said electrodes depending on the electrical conductivity properties of said formation when said spaced electrodes experience a bridging of said formation across said spaced electrodes, and means for maintaining said spaced electrodes at a temperature above the freezing temperature of water so as to assure the transformation to free water of any formation comprised of frost, sleet or snow which may otherwise tend to bridge said spaced electrodes.

10. A device according to claim 8 wherein said reference means comprises an adjustable potentiometer, and wherein said additional means comprises an electronic comparator, said comparator being effective to produce said fourth output signal.

11. A device according to claim 1 wherein said first means comprises transducer means responsive to the presence of said formation and thereupon effective for creating a first parameter output signal, said transducer means comprising spaced electrodes normally having an infinitely large electrical resistance between said electrodes and a range of finite electrical resistances between said electrodes depending on the electrical conductivity properties of said formation when said spaced electrodes experience a bridging of said formation across said spaced electrodes in order to thereby produce said first parameter output signal, said first parameter output signal having a first particular predictable magnitude when said bridging formation comprises free water and a second particular predictable magnitude when said bridging formation comprises frost, ice or snow, reference means for creating a reference signal of a predetermined magnitude functionally equivalent to said second particular predictable magnitude, and additional means for receiving said first parameter output signal and said reference signal, said additional means being effective upon receiving said first parameter output signal and said reference signal for determining whether the magnitude of said first parameter output signal is functionally equivalent to said reference signal and if so to create said fifth output signal.

12. A device according to claim 1 wherein said first means comprises first temperature sensing means adapted to sense the temperature of said surface and produce in accordance therewith a first parameter output signal, first temperature reference means adapted to produce a first reference signal of a predetermined magnitude indicative of a predetermined temperature, first comparator means for receiving said first parameter output signal and said first reference signal, said first comparator means being effective upon receiving said first parameter output signal and said first reference signal for determining if said temperature of said surface is equal to or less than said predetermined temperature and if so create said first output signal, wherein said second means comprises first transducer means responsive to ambient atmospheric temperature and effective to produce in accordance therewith a second parameter output signal, second comparator means for receiving said first parameter output signal and said second parameter output signal, said second comparator means being effective upon receiving said first parameter output signal and said second parameter output signal for determining if a predetermined minimum difference in temperature is indicated by said first and second parameter output signals and if said predetermined minimum difference is attained to create in response thereto said second output signal, wherein said third means comprises second transducer means responsive to ambient atmosphere for determining the relative humidity thereof and creating in response thereto a third parameter output signal, humidity reference means adapted to produce a second reference signal of a predetermined magnitude indicative of a predetermined value of relative humidity, third comparator means for receiving said third parameter output signal and said second reference signal, said third comparator means being effective upon receiving said third parameter means being effective upon receiving said third parameter output signal and said first reference signal for determining if said third parameter output signal indicates a value of relative humidity at least equal to said minimum value of relative humidity established by said first reference signal and to create in response thereto said third output signal, wherein said fourth means comprises third transducer means responsive to the presence of said formation and thereupon effective for creating a fourth parameter output signal, second reference means for creating a third reference signal of a predetermined magnitude, fourth comparator means for receiving said fourth parameter output signal and said third reference signal, said fourth comparator means being effective upon receiving said fourth parameter output signal and said third reference signal for determining if said fourth parameter output signal is equal to or greater than said predetermined magnitude of third reference signal and to create in accordance therewith said fourth output signal, and wherein said fifth means comprises fifth transducer means responsive to the presence of said formation and thereupon effective for creating a fifth parameter output signal, said fifth transducer means comprising spaced electrodes normally having an infinitely large electrical resistance between said electrodes and a range of finite electrical resistances between said electrodes depending on the electrical conductivity properties of said formation when said spaced electrodes experience a bridging of said formation across said spaced electrodes in order to thereby produce said fifth parameter output signal, said fifth parameter output signal having a first predictable magnitude when said bridging formation comprises free water and a second predictable magnitude when said bridging formation comprises frost, ice or snow, third reference means for creating a fourth reference signal of a predetermined magnitude functionally equivalent to said second predictable magnitude, and fifth comparator means for receiving said fifth parameter output signal and said fourth reference signal, said fifth comparator means being effective upon receiving said fifth parameter output signal and said fourth reference signal for determining whether the magnitude of said fifth parameter output signal is functionally equivalent to said fourth reference signal and if so to create said fifth output signal.